(12) United States Patent
Wisch

(10) Patent No.: US 11,195,034 B2
(45) Date of Patent: Dec. 7, 2021

(54) SEAT CONFIGURATION VERIFICATION SYSTEM AND METHOD

(71) Applicant: THE BOEING COMPANY, Chicago, IL (US)

(72) Inventor: Amy L. Wisch, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/529,946

(22) Filed: Aug. 2, 2019

(65) Prior Publication Data

US 2020/0311447 A1 Oct. 1, 2020

Related U.S. Application Data

(60) Provisional application No. 62/825,868, filed on Mar. 29, 2019.

(51) Int. Cl.
| | |
|---|---|
| *G06K 9/00* | (2006.01) |
| *B64D 11/06* | (2006.01) |
| *B64D 45/00* | (2006.01) |
| *B64D 47/08* | (2006.01) |
| *G06Q 50/14* | (2012.01) |
| *G06Q 10/06* | (2012.01) |
| *B60N 2/01* | (2006.01) |
| *B60N 2/02* | (2006.01) |

(52) U.S. Cl.
CPC ........ *G06K 9/00832* (2013.01); *B64D 11/064* (2014.12); *B64D 45/0005* (2013.01); *B64D 47/08* (2013.01); *G06Q 50/14* (2013.01)

(58) Field of Classification Search
CPC ........... G06K 9/00832; G06K 9/00771; B64D 11/064; B64D 45/0005; B64D 47/08; G06Q 50/14; B60K 2370/21; B60L 53/37; B60Q 9/005; B60R 2300/8006
See application file for complete search history.

(56) References Cited

U.S. PATENT DOCUMENTS

| | | |
|---|---|---|
| 7,713,009 B2 | 5/2010 | Hudson |
| 7,785,053 B2 | 8/2010 | Hudson |
| 8,128,326 B2 | 3/2012 | Hudson |
| 8,920,085 B2 | 12/2014 | Hudson |
| 9,567,086 B2 | 2/2017 | Siegmeth |

(Continued)

FOREIGN PATENT DOCUMENTS

| | | |
|---|---|---|
| EP | 0973079 | 1/2000 |
| WO | WO 2018/077467 | 5/2018 |

OTHER PUBLICATIONS

U.S. Appl. No. 16/365,788, filed Mar. 27, 2019.

(Continued)

*Primary Examiner* — Alexander Gee

(74) *Attorney, Agent, or Firm* — The Small Patent Law Group LLC; Joseph M. Butscher

(57) ABSTRACT

A seat configuration verification system and method for an internal cabin of a vehicle include a verification control unit that receives position data regarding positions of seat assemblies within the internal cabin. The verification control unit compares the position data with seat configuration data representative of the seat configuration to determine if the positions of the seat assemblies within the internal cabin conform to the seat configuration.

20 Claims, 7 Drawing Sheets

(56) References Cited

U.S. PATENT DOCUMENTS

| | | | |
|---|---|---|---|
| 2006/0032979 A1* | 2/2006 | Mitchell | B64D 11/00155 |
| | | | 244/118.6 |
| 2008/0100450 A1* | 5/2008 | Ayyagari | B64D 25/18 |
| | | | 340/572.7 |
| 2008/0236275 A1* | 10/2008 | Breed | B60N 2/2806 |
| | | | 73/290 V |
| 2010/0318387 A1* | 12/2010 | Kishore | G06Q 50/14 |
| | | | 705/5 |
| 2012/0041619 A1 | 2/2012 | Rudduck | |
| 2012/0072079 A1* | 3/2012 | Schliwa | B64D 11/0696 |
| | | | 701/49 |
| 2012/0145867 A1 | 6/2012 | Benthien | |
| 2016/0180017 A1* | 6/2016 | Savian | B64F 5/00 |
| | | | 703/8 |
| 2017/0113801 A1 | 4/2017 | Brunaux | |
| 2017/0178260 A1* | 6/2017 | Wilde | G06F 3/011 |
| 2018/0244175 A1* | 8/2018 | Tan | B60N 2/22 |

OTHER PUBLICATIONS

U.S. Appl. No. 16/365,777, filed Mar. 27, 2019.
U.S. Appl. No. 16/529,921, filed Aug. 2, 2019.
U.S. Appl. No. 16/529,935, filed Aug. 2, 2019.
U.S. Appl. No. 16/671,226, filed Nov. 1, 2019.
U.S. Appl. No. 16/529,957, filed Aug. 2, 2019.
U.S. Appl. No. 16/368,925, filed Mar. 29, 2019.
U.S. Appl. No. 16/367,314, filed Mar. 28, 2019.
U.S. Appl. No. 16/368,934, filed Mar. 29, 2019.
U.S. Appl. No. 16/671,238, filed Nov. 1, 2019.
Extended European Search Report for EP 20166276.4-1010, dated Aug. 24, 2020.

\* cited by examiner

SEAT CONFIGURATION VERIFICATION SYSTEM AND METHOD

RELATED APPLICATIONS

This application relates to and claims priority benefits from U.S. Provisional Patent Application No. 62/825,868, entitled "Seat Configuration Verification System and Method," filed Mar. 29, 2019, which is hereby incorporated by reference in its entirety.

FIELD OF EMBODIMENTS OF THE DISCLOSURE

Embodiments of the present disclosure generally relate to seat configuration verification systems and methods, and more particularly, to seat configuration verification systems and methods that may be used to verify seat configurations within internal cabins of vehicles, such as commercial aircraft.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

Between flights of an aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section.

In order to change a seat configuration, mechanics typically view the various seats to change, measure distances for seat re-location, and manually reposition the seats. The process of re-locating the seats may be time and labor intensive. In particular, a reconfiguration of seats within an aircraft generally occurs during a maintenance operation that occurs over hours, if not days.

Moreover, as can be appreciated, certain seats may not be accurately re-positioned according to locations defined by a particular seat configuration plan. For example, one or more seats may not be located at a correct pitch in relation to one or more other seats. Human error typically accounts for positioning discrepancies, such as when individuals attempt to reposition the seats too quickly to meet particular deadlines.

SUMMARY OF THE DISCLOSURE

A need exists for a system and a method for quickly and efficiently verifying a seat configuration for an internal cabin of a vehicle, such as a commercial aircraft. A need exists for a system and a method that allow for quick reconfiguration of seats within an internal cabin, such as may occur between flights of an aircraft.

With those needs in mind, certain embodiments of the present disclosure provide a seat configuration verification system for an internal cabin of a vehicle. The seat configuration verification system includes a verification control unit that receives position data regarding positions of seat assemblies within the internal cabin. The verification control unit compares the position data with seat configuration data representative of the seat configuration to determine if the positions of the seat assemblies within the internal cabin conform to the seat configuration.

In at least one embodiment, one or more monitoring devices acquire the position data. The verification control unit receives the position data from the monitoring device(s). For example, the monitoring device(s) includes a camera that acquires images of the seat assemblies. The position data includes the images of the seat assemblies.

In at least one embodiment, the seat configuration verification system also includes a seat configuration database that stores the seat configuration data. The the verification control unit retrieves the seat configuration data from the seat configuration database.

The verification control unit may be remotely located from the vehicle. Optionally, the verification control unit may be onboard the vehicle.

In at least one embodiment, the verification control unit compares the position data with the seat configuration data through image analysis.

The verification control unit sends a verification signal indicative of a proper seat configuration within the internal cabin in response to the position data conforming to the seat configuration data. Conversely, the verification control unit sends a discrepancy signal indicative of at least one discrepancy with respect to the positions of the seat assemblies within the internal cabin in relation to the seat configuration in response to the position data not conforming to the seat configuration. Further, the verification control unit may transmit position correction data including one or more tasks to fix the at least one discrepancy.

In at least one embodiment, the position data is transmitted to the verification control unit from one or more cameras within the internal cabin. In at least one embodiment, the position data is transmitted to the verification control unit from a position monitor of the vehicle.

Certain embodiments of the present disclosure provide a seat configuration verification method for an internal cabin of a vehicle. The seat configuration verification method includes receiving (by a verification control unit) position data regarding positions of seat assemblies within the internal cabin, comparing (by the verification control unit) the position data with seat configuration data representative of the seat configuration, and determining, by the comparing, if the positions of the seat assemblies within the internal cabin conform to the seat configuration.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a seat configuration verification system and method for an internal cabin of a vehicle. The seat configuration verification system and method include one or more monitoring devices that detect positions of seats within the internal cabin. A verification control unit receives position data from the monitoring devices. The position data represents the position of the seats within the internal cabin. The verification control unit analyzes the position data in relation to seat configuration data, such as stored in a seat configuration database. The seat configuration data is representative of a particular seat configuration plan that is to be used within the internal cabin. The verification control unit compares the position data to the seat configuration data to determine whether the position of the seats within the internal cabin conform to the seat configuration plan. The verification control unit communicates with the monitoring device to notify the status of the position of the seats, such as whether the seats conform to the seat configuration plan, or whether one or more seats are to be repositioned in order to conform to the seat configuration plan.

In at least one embodiment, the seat configuration verification system and method detects positions of seats, monuments (such as lavatories, galleys, partitions, and the like) within an internal cabin. The seats and monuments are components that may be initially installed in an initial configuration, such as by an original equipment manufacturer. These components may be reconfigured, as described herein, and embodiments of the present disclosure provide systems and methods of verifying positions within subsequent configurations.

Figure 1:
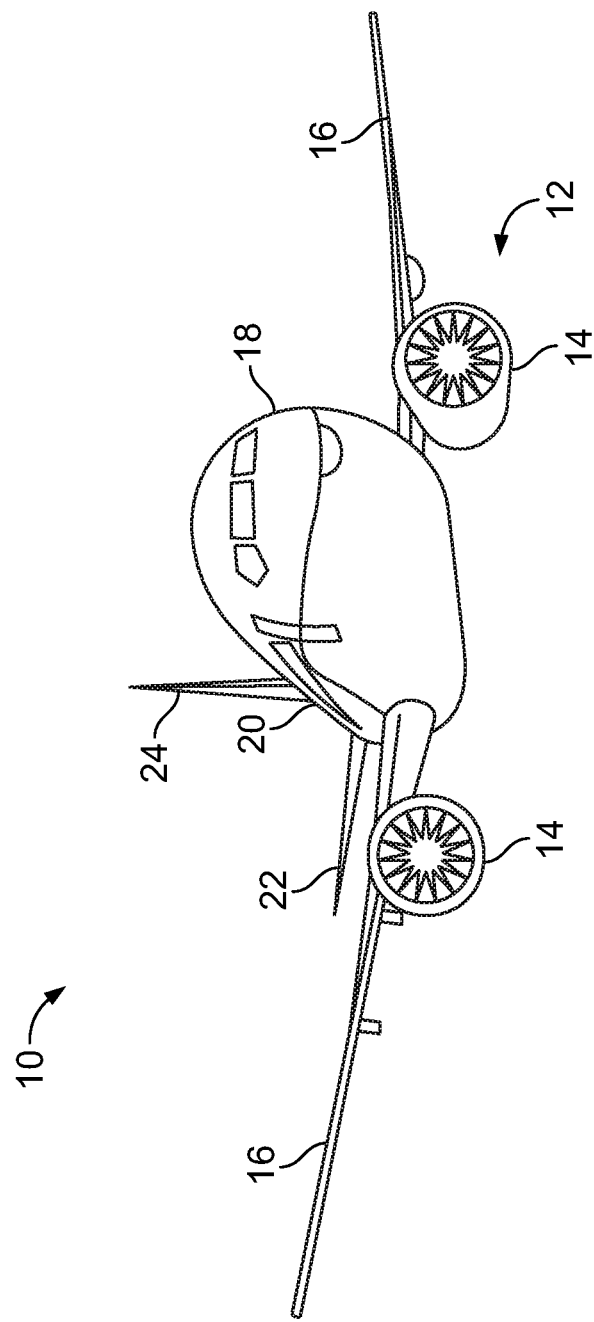
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
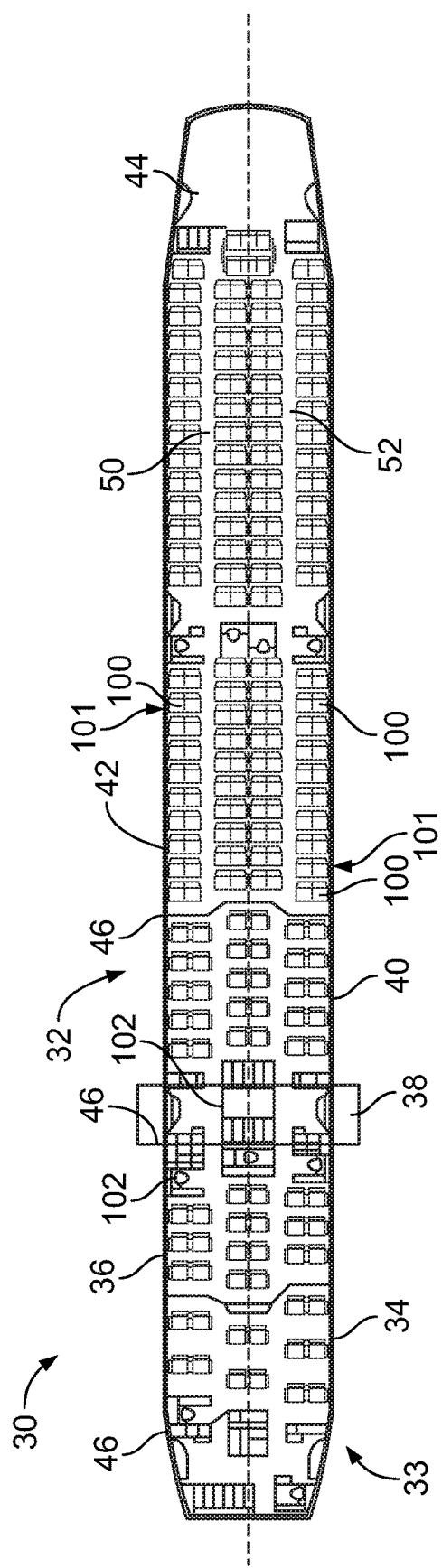
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101. Spacing or pitch between rows 101 of adjacent seat assemblies 100 may be changed, such as between flights.

As shown in FIG. 2A, the seat assemblies 100, monuments 102 (such as galleys and lavatories) are in a particular seat configuration that is arranged according to a seat configuration plan. The seat configuration plan specifies the locations of the various sections, the number of seat assemblies within the version, the pitch between rows of seat assemblies within the sections, and the like. The seat configuration within the internal cabin 30 may be changed to a different seat configuration, in which at least certain aspects (such as seat pitch between certain rows) differ from the previous seat configuration.

Figure 2B:
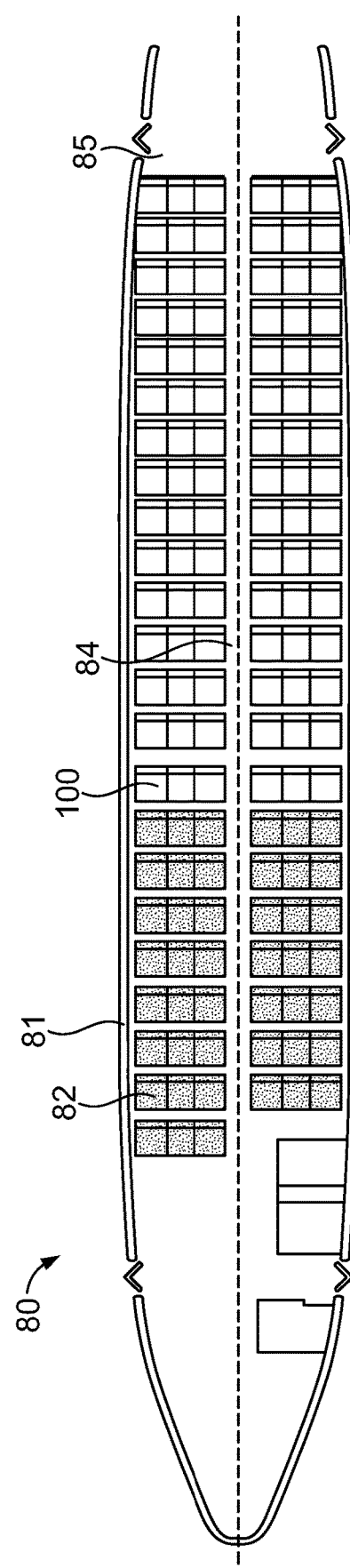
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

FIG. 2B also shows a seat configuration in which the seat assemblies 100 are arranged according to a seat configuration plan. The seat configuration may be changed to a different seat configuration.

Figure 3:
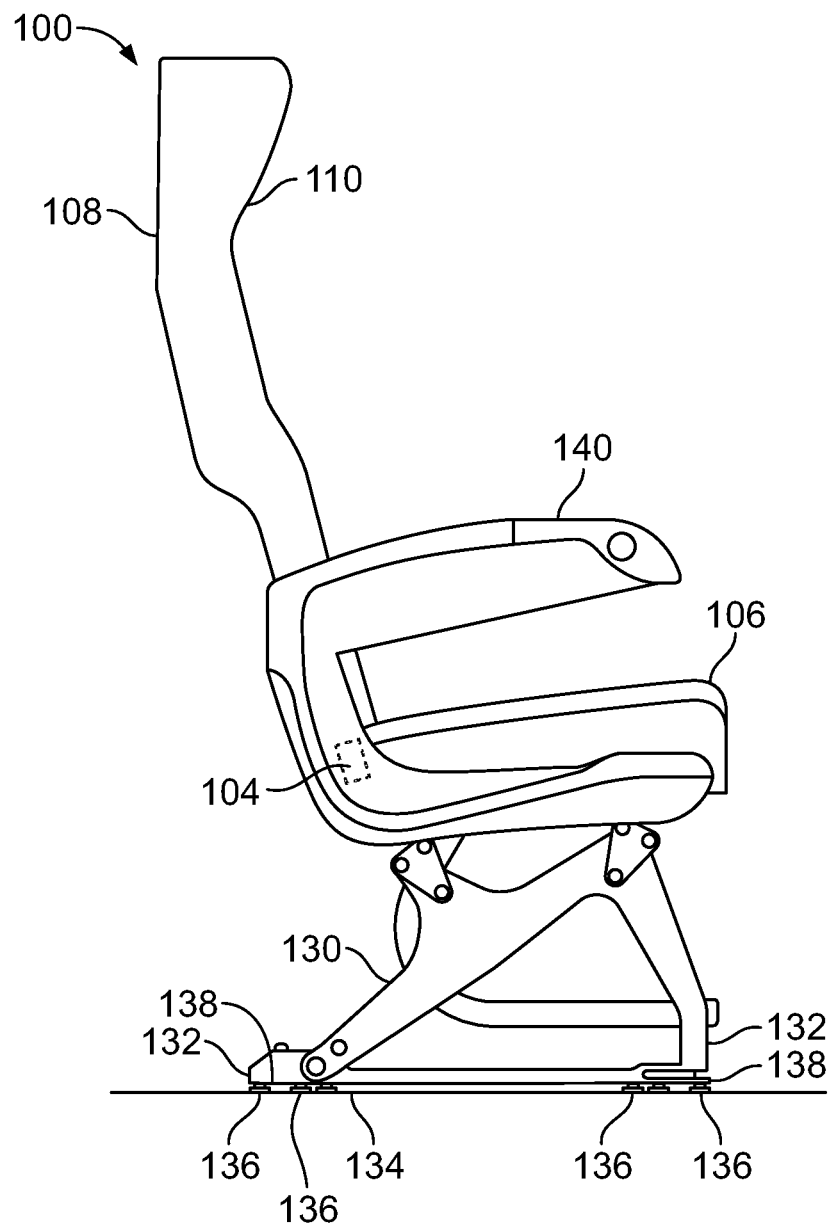
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

The seat assembly 100 may include a position sensor 104. The position sensor 104 may be located on or in various portions of the seat assembly 100. The position sensor 104 may be a radio frequency identification (RFID) sensor, for example that indicates the position of the particular seat assembly 100. In at least one other embodiment, the position sensor 104 may be an integrated circuit or microchip in communication with a monitoring system that determines the position of the seat assembly 100 via the position sensor 104 through communication therewith. In at least one other embodiment, the position sensor 104 may be a global positioning system (GPS) device that may be monitored and tracked by a GPS monitoring system, or a local GPS monitoring system onboard a vehicle. As another example, the position sensor 104 may be an electromagnetic position sensor that is tracked via an electromagnetic monitoring system. The position sensor 104 may be any type of structure or device that may be tracked by a corresponding monitoring system. Optionally, the seat assembly 100 may not include the position sensor 104.

Figure 4:
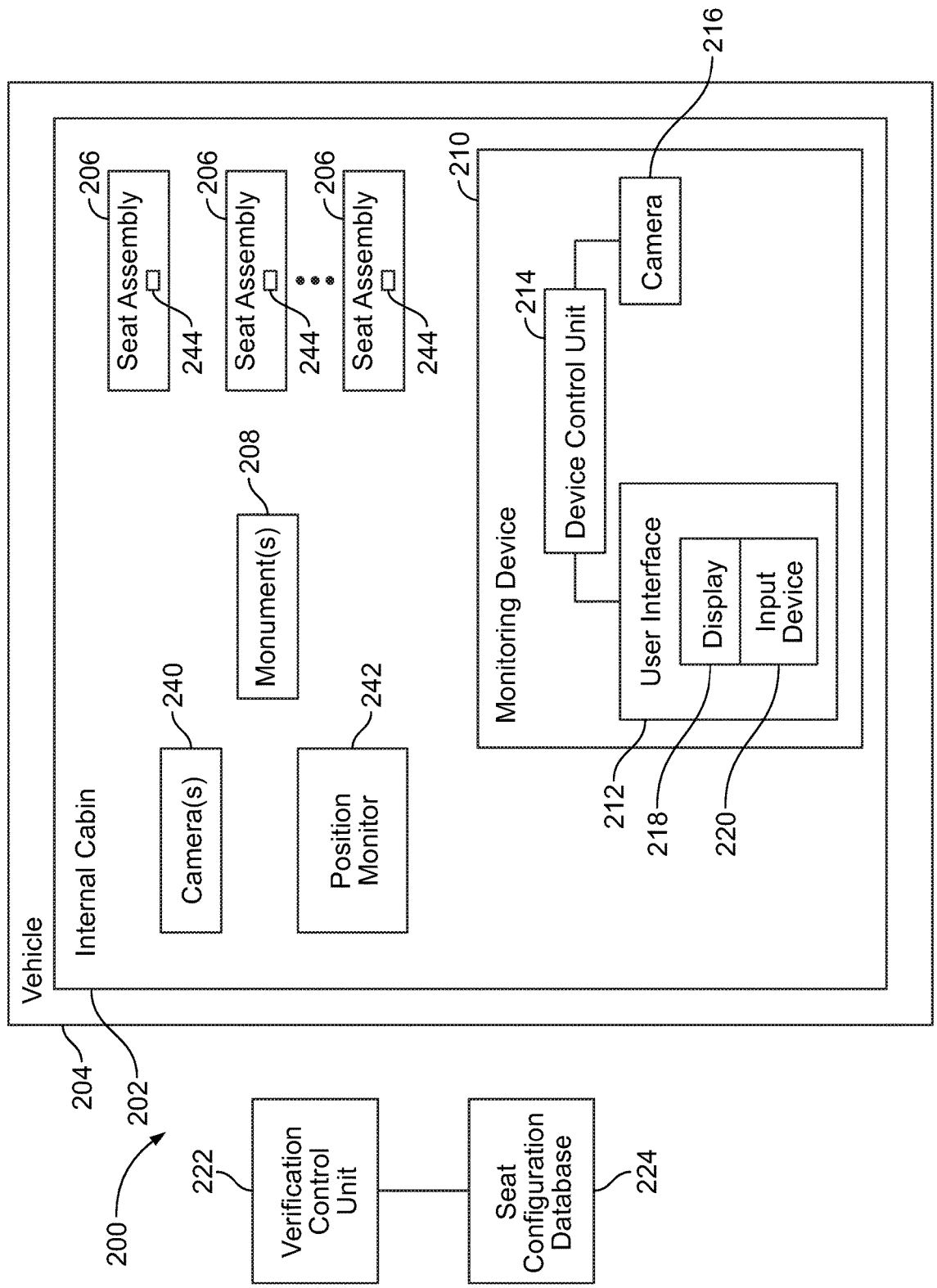
FIG. 4 illustrates a schematic block diagram of a seat configuration verification system for an internal cabin of a vehicle, according to an embodiment of the present disclosure.

FIG. 4 illustrates a schematic block diagram of a seat configuration verification system 200 for an internal cabin 202 of a vehicle 204, according to an embodiment of the present disclosure. The aircraft 10 shown in FIG. 1 is an example of the vehicle 204. The internal cabins 30 and 80 shown in FIGS. 2A and 2B, respectively, are examples of the internal cabin 202.

Seat assemblies 206 are positioned within the internal cabin 202. The seat assemblies 100 shown in FIGS. 1-3 are examples of the seat assemblies 206. The internal cabin 202 also includes one or more monuments 208, such as lavatories, galleys, and the like. The monuments 102 shown in FIG. 1 are examples of the monuments 208.

A monitoring device 210 is within the internal cabin 202. In at least one embodiment, the monitoring device 210 is a handheld smart device, such as a smart tablet or smart phone. In at least one other embodiment, the monitoring device 210 may be a portable computer workstation within the internal cabin 202. In at least other embodiment, the monitoring device 210 may be fixed at a location within the internal cabin 202, such as in or proximate to an attendant workstation.

The monitoring device 210 includes a user interface 212 in communication with a device control unit 214, such as through one or more wired or wireless connections. The monitoring device 210 also includes a camera 216 (such as a video and/or still picture camera) in communication with the device control unit 214 through one or more wired or wireless connections. In at least one other embodiment, the monitoring device 210 may include a sensing system, such as a radio frequency identification (RFID) tag, smart microchip, or the like on a component, and a corresponding sensing system that detects the location of the RFID tag, smart microchip, or the like.

The user interface 212 includes a display 218 coupled to an input device 220. In at least one embodiment, the display 218 is a screen, monitor, or the like. For example, the display 218 and the input device 220 may form a touchscreen interface of the monitoring device 210, which may be a handheld device. In at least one other embodiment, the input device 220 may be one or more of a keyboard, a mouse, a stylus, and/or the like.

The seat configuration verification system 200 also includes a verification control unit 222 in communication with a seat configuration database 224, such as through one or more wired or wireless connections. The verification control unit 222 is also in communication with the monitoring device 210, such as through a wireless connection (for example, internet connectivity, wireless cellular or other radio frequency signals, and/or the like).

The verification control unit 222 may be remotely located from the vehicle 204. For example, the verification control unit 222 may be located at a central monitoring station that is remote from the vehicle 204. In at least one other embodiment, the verification control unit 222 may be onboard the vehicle 204, such as within the internal cabin 202, a cockpit, or the like. The verification control unit 222 may be at the same location as the seat configuration database 224. In at least one other embodiment, the verification control unit 222 and the seat configuration database 224 are remotely located from one another.

The seat configuration database 224 stores seat configuration data for one or more seat configurations for the seat assemblies 206 within the internal cabin 202. The seat configurations may also include the monuments 208. The seat configuration data is representative of a particular seat configuration plan that is to be used within the internal cabin. The seat configuration within the internal cabin is arranged according to the seat configuration plan. Examples of seat configurations are shown in FIGS. 2A and 2B. The seat configuration database 224 may store seat configuration data for multiple seat configurations that may be used in the internal cabin 202 of the vehicle 204. A first seat configuration of the seat assemblies 206 may be used during a first trip (such as a first flight) of the vehicle 204, and a second seat configuration of the seat assemblies 206 may be used during a subsequent second trip (such as a second flight) of the vehicle 204. As an example, the seat configuration database 224 stores first seat configuration data for the first seat configuration and second seat configuration data for the second seat configuration.

As described herein, the seat configuration verification system 200 includes the verification control unit 222, which receives position data regarding positions of the seat assemblies 206 within the internal cabin 202. The verification control unit 222 compares the position data with seat configuration data representative of the seat configuration (for example, a seat configuration having properly arranged seat assemblies) to determine if the positions of the seat assemblies 206 within the internal cabin 202 conform to the seat configuration.

In operation, the monitoring device 210 acquires one or more images of the seat assemblies 206 within the internal cabin 202. For example, an individual walks through the internal cabin 202 and takes multiple images of the seat assemblies 206 via the camera 216. The images show the seat assemblies 206 in relation to one another and other features within the internal cabin 202, such as the monuments 208, side walls, stowage bins, ceiling, floor, seat tracks, and the like. The monitoring device 210 transmits the images of the seat assemblies 206 to the verification control unit 222 as position data, which regards the positions of the seat assemblies within the internal cabin 202. In at least one embodiment, the position data includes images (such as still photos and/or motion video) of all of the seat assemblies 206 within the internal cabin 202.

The verification control unit 222 receives the position data from the monitoring device 210 and retrieves seat configuration data representative of a desired seat configuration for the internal cabin 202. In at least one embodiment, the individual may transmit information regarding a particular desired seat configuration to the verification control unit 222.

Figure 5:
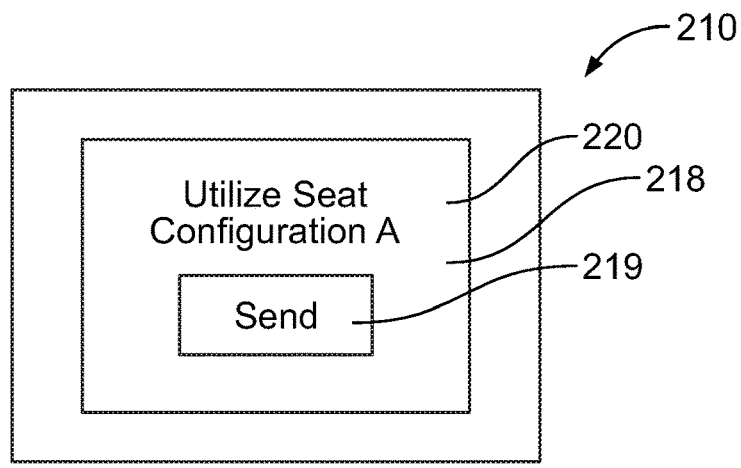
FIG. 5 illustrates a front view of a monitoring device used to select a seat configuration, according to an embodiment of the present disclosure.

FIG. 5 illustrates a front view of the monitoring device 210 used to select a seat configuration, according to an embodiment of the present disclosure. As shown, the monitoring device 210 may be a handheld device having a touchscreen interface that includes the display 218 and the input device 220. The display 218 indicates that seat configuration A is selected. After selection of the desired seat configuration, the individual engages the send button 219 (which may be a virtual button on the touchscreen interface), thereby transmitting the selection to the verification control unit 222.

Referring again to FIG. 4, the verification control unit 222 receives the selection of the seat configuration from the monitoring device 210. The verification control unit 222 then retrieves the seat configuration data for the selected seat configuration from the seat configuration database 224. Next, the verification control unit 222 compares the position data representative of the seat assemblies 206 within the internal cabin to the seat configuration data, which includes the positions of the seat assemblies 206 according to the seat configuration plan. For example, the verification control unit 222 may determine similarities and differences between the position data (which may include image data) with seat configuration data (which may include image data for the seat configuration, as properly arranged). The verification control unit 222 may determine the similarities and differences through image analysis, for example, As an example, the verification control unit 222 analyzes the position data to detect positional relationships between one or more features of the seat assemblies 206, the monuments 208, walls, ceilings, and other structures within the internal cabin 202, and compares the positional relationships in the position data with the corresponding positional relationships in the seat configuration data.

If the position data conforms to the seat configuration data for the selected seat configuration, the verification control unit 222 verifies that the seat configuration within the internal cabin 202 conforms to the seat configuration plan. The verification control unit 222 then sends a verification signal indicative of the proper seat configuration within the internal cabin 202 to the monitoring device 210.

Figure 6:
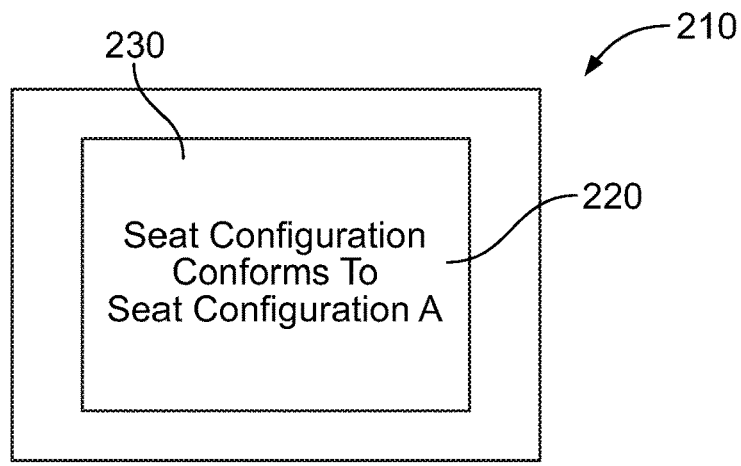
FIG. 6 illustrates a front view of the monitoring device showing a seat configuration verification, according to an embodiment of the present disclosure.

FIG. 6 illustrates a front view of the monitoring device 210 showing a seat configuration verification, according to an embodiment of the present disclosure. For example, the monitoring device 210 may show on the user interface 220 a verification message 230, which may include text, graphics, color coding, video, and/or the like indicating that the seat configuration of the seat assemblies 206 (and optionally the monuments 208) within the internal cabin conforms to the selected seat configuration.

Referring again to FIG. 4, if, however, the position data does not conform to the seat configuration data for the selected seat configuration, the verification control unit 222 determines that the seat configuration within the internal cabin 202 does not conform to the seat configuration plan. The verification control unit 222 then sends a discrepancy signal indicative of at least one discrepancy with respect to the positions of the seat assemblies 206 in relation to the stored seat configuration.

Figure 7:
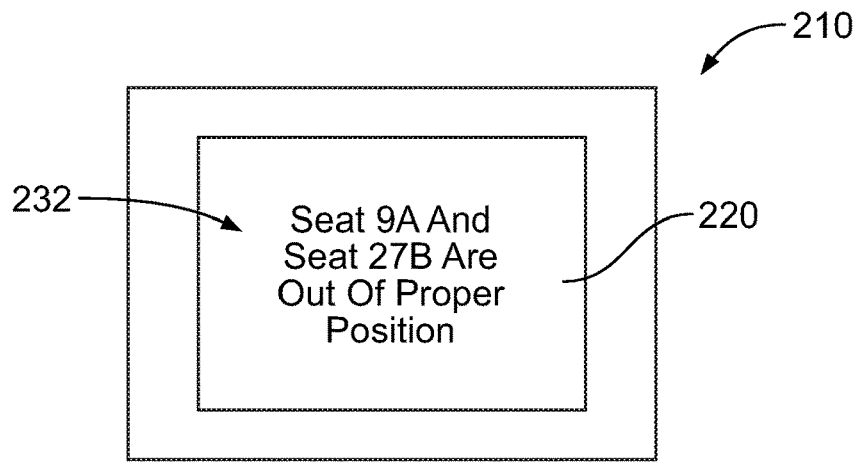
FIG. 7 illustrates a front view of the monitoring device showing discrepancies of the seat configuration within an internal cabin, according to an embodiment of the present disclosure.

FIG. 7 illustrates a front view of the monitoring device 210 showing the discrepancies 232 of the seat configuration within the internal cabin 202, according to an embodiment of the present disclosure. For example, the monitoring device 210 may show on the user interface 220 the discrepancies 232, which may include text, graphics, color coding, video, and/or the like indicating that the seat configuration of the seat assemblies 206 (and optionally the monuments 208) within the internal cabin does not conform to the selected seat configuration. As shown, the discrepancies 232 may note which seat assemblies are out of proper position for the selected seat configuration.

Referring again to FIG. 4, in at least one embodiment, the verification control unit 222 may also transmit position correction data to the monitoring device 210. The position correction data relates to how the particular discrepancy is to be fixed. For example, the position correction data includes one or more tasks (such as steps, procedures, or the like) to fix the disrepanc(ies). As an example, the verification control unit 222 may transmit the position correction data, which may be shown on the user interface 220. For example, the position correction data shown on the user interface 220 may indicate "relocate seat 9A two inches aft." The process may repeat after the discrepancies have been remedied. That is, after an individual corrects a discrepancy, per the position correction data, the monitoring device 210 may re-image the seat assembly 206 that was the source of the discrepancy, and the verification control unit 222 may analyze the image, as described herein.

In at least one embodiment, portions of the internal cabin 202 may be imaged by the monitoring device 210. That is, the monitoring device 210 need not image the entire internal cabin 202. Instead, a particular section of the internal cabin 202 may be imaged by the monitoring device 210, and subsequently analyzed by the verification control unit 222. In at least one embodiment, multiple monitoring devices 210 may be used to image multiple, even the entirety, of the internal cabin 202, and the verification control unit 222 may analyze the position data received from the multiple monitoring devices 210, as described herein.

In at least one other embodiment, the internal cabin 202 may include one or more cameras 240 (other than the camera 216 of the monitoring device 210) that acquire images of the seat assemblies 206. As such, the cameras 240 may be an additional monitoring device that is separate and distinct from the monitoring device 210. The cameras 240 are in communication with the verification control unit 222, such as through a wireless connection. The camera(s) 240 within the internal cabin 202 may transmit the position data, including the images of the seat assemblies 206, to the verification control unit, as described above with respect to the monitoring device 210. In at least one embodiment, the position data may be sent to the verification control unit 222 via the camera(s) 240 within the internal cabin 202, in addition to, or instead of the camera 216 of the monitoring device 210. Optionally, in at least one other embodiment, the verification control unit 222 may not receive position data from the camera(s) 240 of the internal cabin 202.

In at least one other embodiment, a position monitor 242 may be within the vehicle 204, such as within the internal cabin 202. The position monitor 242 may be an RFID monitor, a local GPS monitor, an electromagnetic monitor, or the like, that is configured to detect positions of the seat assemblies 206 through associated position sensors 244, such as the position sensor 104 shown and described with respect to FIG. 3. Accordingly, the position sensor 242 may be an additional monitoring device that is separate and distinct from the monitoring device 210 and the camera(s) 240. The position monitor 242 is in communication with the verification control unit 222 through a wireless connection, for example. The position monitor 242 may transmit the position data, as determined through monitoring the position sensors 244 of the seat assemblies 206, to the verification control unit 222 as described above with respect to the monitoring device 210. The verification control unit 222 may analyze and compare the position data from the position monitor 242 with seat configuration data, as described above. The position data from the position monitor 242 and the associated seat configuration data may be in positional format (such as coordinate data), as opposed to image data. In at least one embodiment, the position data may be sent to the verification control unit 222 via the position monitor 242 within the internal cabin 202, in addition to, or instead of the camera 216 of the monitoring device 210 and/or the camera(s) 240. Optionally, in at least one other embodiment, the verification control unit 222 may not receive position data from the position monitor 242 of the internal cabin 202.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the device control unit 214 and the verification control unit 222 may be or include one or more processors that are configured to control operation thereof, as described herein.

The device control unit 214 and the verification control unit 222 are configured to execute a set of instructions that are stored in one or more data storage units or elements (such as one or more memories), in order to process data. For example, the device control unit 214 and the verification control unit 222 may include or be coupled to one or more memories. The data storage units may also store data or other information as desired or needed. The data storage units may be in the form of an information source or a physical memory element within a processing machine.

The set of instructions may include various commands that instruct the device control unit 214 and the verification control unit 222 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the device control unit 214 and the verification control unit 222. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the device control unit 214 and the verification control unit 222 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 8:
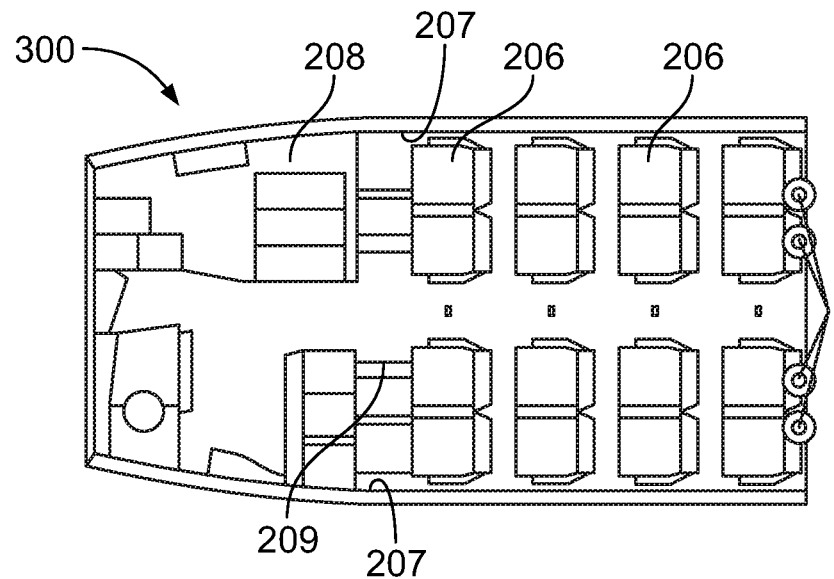
FIG. 8 illustrates an image of a front portion of an internal cabin, according to an embodiment of the present disclosure.
Figure 9:
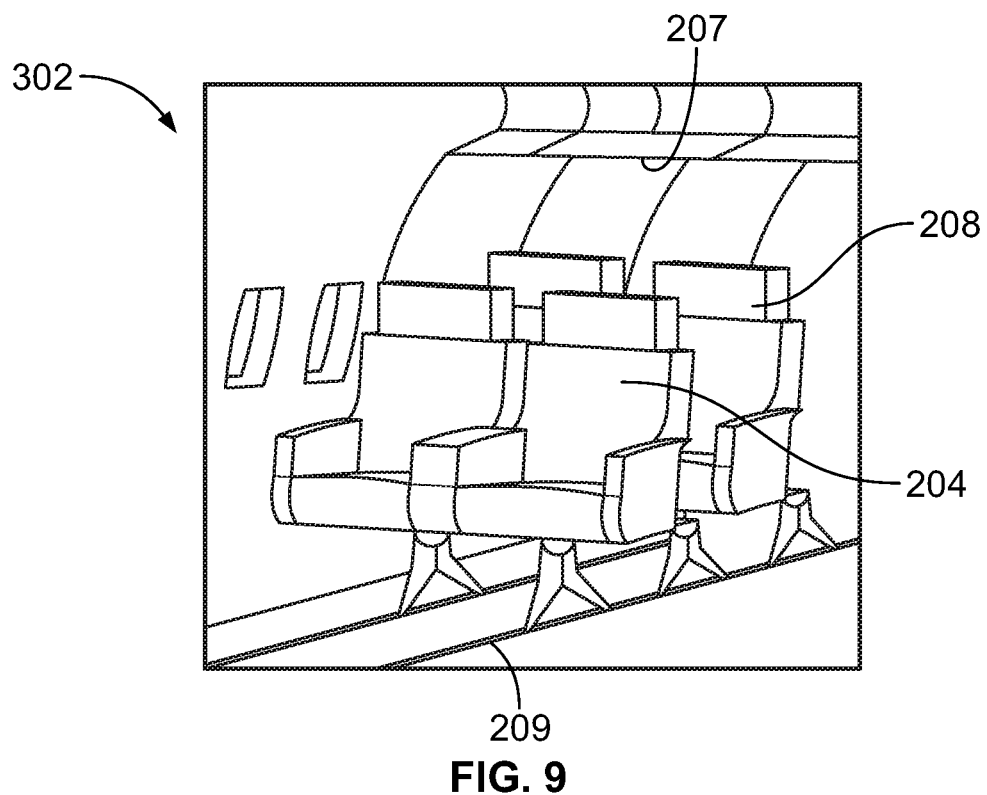
FIG. 9 illustrates an image of a front portion of an internal cabin with a perspective front view, according to an embodiment of the present disclosure.

FIG. 8 illustrates an image 300 of a front portion of the internal cabin 202, according to an embodiment of the present disclosure. FIG. 9 illustrates an image 302 of a front portion of the internal cabin 202 with a perspective front view, according to an embodiment of the present disclosure.

Referring to FIG. 4, as described above, the verification control unit 222 may analyze the images 300 and 302 to determine positional relationships between various seat assemblies 206, monuments 208, seat tracks 209, and other structural features 207 within the internal cabin 202. The verification control unit 222 compares such positional relationships against corresponding images of the seat configuration data, as retrieved from the seat configuration database 224, in order to determine whether the current seat configuration within the internal cabin 202 conforms to the selected seat configuration.

Figure 10:
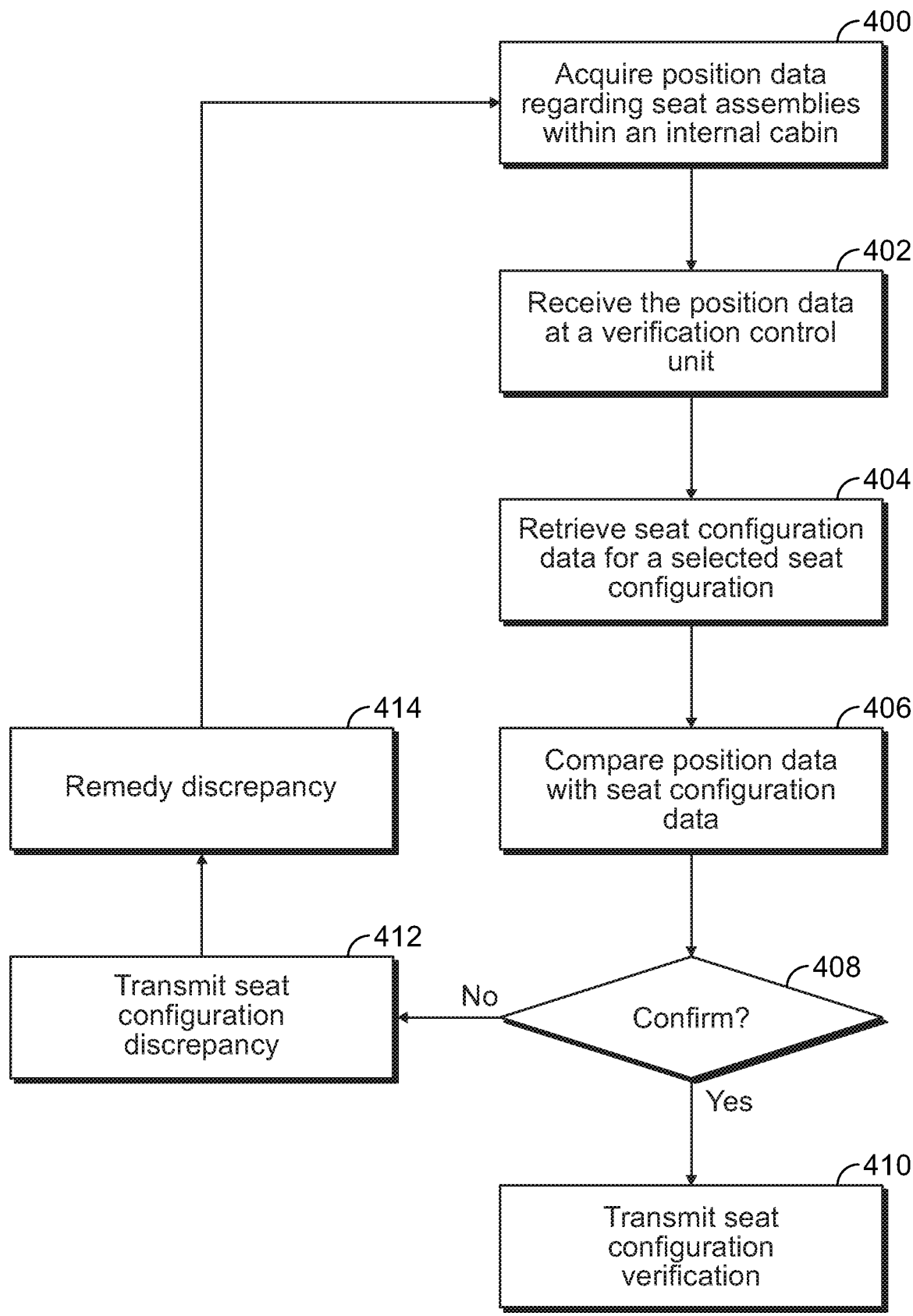
FIG. 10 illustrates a flow chart of a seat configuration verification method, according to an embodiment of the present disclosure.

FIG. 10 illustrates a flow chart of a seat configuration verification method, according to an embodiment of the present disclosure. Referring to FIGS. 4 and 10, at 400, position data regarding the seat assemblies 206 within the internal cabin 202 is acquired, such as via the monitoring device 210, the camera(s) 240, and/or the position monitor 242. At 402, the position data is received at the verification control unit 222.

At 404, seat configuration data for a selected seat configuration is retrieved from the seat configuration database 224 by the verification control unit 222. At 406, the verification control unit 222 compares the position data with the seat configuration data.

At 408, the verification control unit 222 determines if the position data conforms to (that is, in agreement with) the seat configuration data. If so, the method proceeds from 408 to 410, at which the verification control unit 410 transmits seat configuration verification, such as to the monitoring device 210.

If, however, the verification control unit 222 determines that the position data does not conform to the seat configuration data (that is, at least one discrepancy therebetween), the method proceeds from 408 to 412, at which the verification control unit 412 transmits a seat configuration discrepancy message, such as to the monitoring device 210. At 414, the discrepancy is remedied (or at least attempted to be remedied). The process then returns to 400.

Embodiments of the present disclosure provide systems and methods that allow large amounts of data to be quickly and efficiently analyzed by a computing device. Large amounts of data are being tracked and analyzed. The vast amounts of data are efficiently organized and/or analyzed by the verification control unit 222, as described herein. The verification control unit 222 analyzes the data in a relatively short time in order to quickly and efficiently output seat configuration verification determinations. A human being would be incapable of efficiently analyzing such vast amounts of data in such a short time. As such, embodiments of the present disclosure provide increased and efficient functionality, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

As described herein, embodiments of the present disclosure provide systems and methods for quickly and efficiently verifying a seat configuration for an internal cabin of a vehicle, such as a commercial aircraft. Embodiments of the present disclosure provide systems and methods that allow for quick reconfiguration of seats within an internal cabin, such as may occur between flights of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:
1. A system comprising:
a vehicle including an internal cabin and seat assemblies within the internal cabin, wherein the seat assemblies comprise position sensors including radio frequency identification (RFID) tags; and
a seat configuration verification system comprising:
one or more monitoring devices configured to allow selection among a plurality of seat configurations;
a position monitor that detects the positions of the RFID tags of the seat assemblies, wherein the position monitor outputs first position data regarding the positions of the seat assemblies within the internal cabin, wherein the first position data is based on the locations of the RFID tags as detected by the position monitor; and a verification control unit including one or more processors that receives the first position data from the position monitor, wherein the verification control unit compares the first position data with seat configuration data representative of a selected one of the plurality of seat configurations selected through use of the one or more monitoring devices to determine if the positions of the seat assemblies within the internal cabin conform to the selected one of the seat configurations.

2. The system of claim 1, wherein the one or more monitoring devices are further configured to acquire second position data, wherein the verification control unit receives the second position data from the one or more monitoring devices, and wherein the verification control unit compares the second position data with the seat configuration data representative of the seat configuration to determine if the positions of the seat assemblies within the internal cabin conform to the selected one of the seat configurations.

3. The system of claim 2, wherein the one or more monitoring devices comprises a camera, wherein the camera acquires images of the seat assemblies, and wherein the second position data includes the images of the seat assemblies.

4. The system of claim 1, further comprising a seat configuration database that stores the seat configuration data, wherein the verification control unit retrieves the seat configuration data from the seat configuration database.

5. The system of claim 1, wherein the verification control unit is remotely located from the vehicle.

6. The system of claim 1, wherein the verification control unit is onboard the vehicle.

7. The system of claim 3, wherein the verification control unit compares the second position data with the seat configuration data through image analysis.

8. The system of claim 1, wherein the verification control unit sends a verification signal indicative of a proper seat configuration within the internal cabin in response to the first position data conforming to the seat configuration data.

9. The system of claim 1, wherein the verification control unit sends a discrepancy signal indicative of at least one discrepancy with respect to the positions of the seat assemblies within the internal cabin in relation to the selected one of the seat configurations in response to the first position data not conforming to the seat configuration data.

10. The system of claim 9, wherein the verification control unit transmits position correction data including one or more tasks to fix the at least one discrepancy.

11. The system of claim 2, wherein the second position data is transmitted to the verification control unit from one or more cameras within the internal cabin.

12. A seat configuration verification method for an internal cabin of a vehicle, the seat configuration verification method comprising:

selecting, via one or more monitoring devices, a selected seat configuration among a plurality of seat configurations;

detecting, by a position monitor, positions of radio frequency identification (RFID) tags of position sensors of seat assemblies within the internal cabin of the vehicle;

outputting, by the position monitor, first position data regarding the positions of the seat assemblies within the internal cabin, wherein the first position data is based on the locations of the RFID tags as detected by the position monitor;

receiving, by a verification control unit including one more processors, the first position data from the position monitor;

comparing, by the verification control unit, the first position data with seat configuration data representative of the selected seat configuration; and determining, by the comparing, if the positions of the seat assemblies within the internal cabin conform to the selected seat configuration.

13. The seat configuration verification method of claim 12, further comprising receiving, by the verification control unit, second position data regarding the positions of the seat assemblies from one or more monitoring devices within the internal cabin.

14. The seat configuration verification method of claim 13, further comprising capturing images of the seat assemblies with a camera of the one or more monitoring devices, and wherein the second position data includes the images of the seat assemblies.

15. The seat configuration verification method of claim 12, further comprising retrieving, by the verification control unit, the seat configuration data from a seat configuration database.

16. The seat configuration method of claim 13, wherein the comparing comprises comparing the second position data with the seat configuration data through image analysis.

17. The seat configuration method of claim 12, further comprising sending, by the verification control unit, a verification signal indicative of a proper seat configuration within the internal cabin in response to the first position data conforming to the seat configuration data.

18. The seat configuration method of claim 12, further comprising sending, by the verification control unit, a discrepancy signal indicative of at least one discrepancy with respect to the positions of the seat assemblies within the internal cabin in relation to the selected seat configuration in response to the first position data not conforming to the seat configuration data.

19. The seat configuration method of claim 18, further comprising transmitting, by the verification control unit, position correction data including one or more tasks to fix the at least one discrepancy.

20. The system of claim 1, wherein the vehicle further comprises monuments within the internal cabin, wherein the monuments also comprise the position sensors including the RFID tags, and wherein the selected one of the seat configurations also includes the monuments.

* * * * *